(12) United States Patent
Blott

(10) Patent No.: US 10,984,502 B2
(45) Date of Patent: Apr. 20, 2021

(54) MONITORING APPARATUS FOR PERSON RECOGNITION AND METHOD

(71) Applicant: Robert Bosch GmbH, Stuttgart (DE)

(72) Inventor: Gregor Blott, Salzgitter (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/576,855

(22) Filed: Sep. 20, 2019

(65) Prior Publication Data

US 2020/0098085 A1    Mar. 26, 2020

(30) Foreign Application Priority Data

Sep. 20, 2018   (DE) .................... 10 2018 216 028.7
Aug. 29, 2019   (DE) .................... 10 2019 212 978.1

(51) Int. Cl.
| | |
|---|---|
| *G06T 3/00* | (2006.01) |
| *B64C 39/02* | (2006.01) |
| *G06K 9/00* | (2006.01) |
| *G06T 7/20* | (2017.01) |
| *G05D 1/00* | (2006.01) |
| *G06T 7/215* | (2017.01) |
| *G06T 7/246* | (2017.01) |

(52) U.S. Cl.
CPC .......... *G06T 3/0018* (2013.01); *B64C 39/024* (2013.01); *G05D 1/0094* (2013.01); *G06K 9/00362* (2013.01); *G06T 7/215* (2017.01); *G06T 7/248* (2017.01); *B64C 2201/127* (2013.01); *G06T 2207/10032* (2013.01)

(58) Field of Classification Search
CPC ....... G06T 3/0018; G06T 7/215; G06T 7/248; G06T 2207/10032; B64C 39/024; B64C 2201/127; G05D 1/0094; G06K 9/00362; G06K 9/00369; G06K 9/00771
USPC ......................................................... 348/148
See application file for complete search history.

(56) References Cited

U.S. PATENT DOCUMENTS

| | | | |
|---|---|---|---|
| 2010/0128125 A1 | 5/2010 | Warzelhan | |
| 2012/0045149 A1* | 2/2012 | Arai ...................... | H04N 7/183 |
| | | | 382/296 |
| 2018/0204331 A1* | 7/2018 | Omari ..................... | G06T 7/248 |
| 2018/0253596 A1* | 9/2018 | Barman ................. | G06K 9/209 |
| 2018/0349736 A1* | 12/2018 | Bapat ................. | G06K 9/00295 |
| 2019/0130215 A1* | 5/2019 | Kaestle ............. | G06K 9/00771 |

FOREIGN PATENT DOCUMENTS

EP        2189955        5/2010

* cited by examiner

*Primary Examiner* — Susan E. Hodges
(74) *Attorney, Agent, or Firm* — Michael Best & Friedrich LLP

(57) ABSTRACT

Monitoring apparatus 2 for person recognition in a monitoring region 7, having at least one camera 3 for recording an image sequence of a portion 10 of the monitoring region 7, wherein the image sequence comprises a plurality of monitoring images, having a person recognition module 6, wherein the person recognition module 6 has at least one recognition feature of a person that is to be located and is configured to search for the person to be recognized based on the monitoring images and the recognition feature, wherein the camera 3 has a fisheye lens 4.

14 Claims, 2 Drawing Sheets

MONITORING APPARATUS FOR PERSON RECOGNITION AND METHOD

BACKGROUND OF THE INVENTION

A monitoring apparatus for person recognition in a monitoring region is proposed. The monitoring apparatus has at least one camera for recording an image sequence of a portion of the monitoring region. The image sequence includes a plurality of monitoring images. The monitoring apparatus comprises a person recognition module to search for and/or to re-identify a person to be located based on a recognition feature of said person and the monitoring images. The invention furthermore relates to a method for monitoring a monitoring region and for locating the person.

The monitoring of public areas and/or other monitoring regions using optical methods is widely used. In particular, image-based person recognition in such areas plays an increasingly important role. The objective is, for example, to recognize a person in an airport or a train station and/or to track said person across cameras. For example, children that have gone missing or suspicious persons can in this way be quickly searched for and located.

To this end, video cameras are frequently used, the image material of which is searched for the persons based on person features. A problem with such methods is that, if there are many persons in a monitoring region, a high intraperson variance exists and at the same time a low interperson variance is given.

Document EP 2 189 955 B1, which is probably the closest prior art, describes a sensor network system for tracking moving objects in a monitoring region. The network system comprises a plurality of network nodes that each monitor a partial region of the monitoring region. In particular, the network nodes are embodied in the form of video cameras. The sensor network system is provided with a classifier generator.

SUMMARY OF THE INVENTION

According to the invention, a monitoring apparatus for person recognition in a monitoring region proposed. Furthermore, a method for monitoring the monitoring region and for person recognition is proposed. Preferred and/or advantageous embodiments of the invention are apparent from the dependent claims, from the following description, and the attached figures.

According to the invention, a monitoring apparatus for person recognition in a monitoring region is proposed. In particular, the monitoring apparatus is configured for optical, image-technological and/or video-technological monitoring of the monitoring region. The monitoring apparatus can be used to locate a person that is to be recognized and/or sought in the monitoring region by way of data evaluation and/or image evaluation. The monitoring region is preferably an interior space, alternatively an exterior space or a mixed space. The monitoring region is for example a public building such as an airport, train station or the building of a public body. The monitoring apparatus can furthermore be configured to recognize and/or search for objects, for example items of luggage such as suitcases, vehicles such as cars, or animals.

The monitoring apparatus has at least one camera. Specifically, the monitoring apparatus can have exactly one camera; alternatively, the monitoring apparatus has more than two, five or ten cameras. If the monitoring apparatus has a plurality of cameras, they can be of the same type. The at least one camera and/or the cameras is/are configured to record an image sequence of a portion of the monitoring region or is/are configured to record an image sequence of the entire monitoring region. The portion of the monitoring region is for example the field of view and/or recording region that can be imaged and/or recorded by the camera. The camera is preferably configured and/or arranged for recording the portion of the monitoring region and/or the monitoring region from a bird's-eye perspective. In particular, an optical axis of the camera runs substantially perpendicularly downward in a manner such that the camera captures the portion of the monitoring region and/or the monitoring region in the nadir direction. The portions of the monitoring region monitored by a camera preferably, albeit not necessarily, partially overlap if there are a plurality of cameras, with the result that a person is able to be tracked and/or monitored for example without gaps. The camera is preferably a color camera. The camera for example has a CCD sensor or a CMOS sensor for generating data.

The image sequence includes a plurality of monitoring images. In particular, the image sequence has at least two monitoring images or more than ten monitoring images. The monitoring images in the image sequence are preferably recorded at consistent time intervals or are recorded at random time intervals. The monitoring images optically, in particular two-dimensionally, image the portion of the monitoring region. In particular, the image sequence can form a video sequence. Specifically, the image sequence comprises monitoring images in each case of a single camera. If the monitoring apparatus has a plurality of cameras, preferably a plurality of image sequences are thus produced and/or generated.

The monitoring apparatus has a person recognition module. The person recognition module can form a hardware module, such as a computer unit or a processor chip. Alternatively, the person recognition module can form a software module. The person recognition module is preferably comprised by the camera or is alternatively a central person recognition module. The image sequence and/or the monitoring images of the camera and/or of the cameras is/are made available to the person recognition module. The person recognition module has at least one recognition feature of a person that is to be located. The recognition feature can be comprised by the person recognition module as a recognition datum and/or as a recognition file. For example, the person recognition module can have a plurality of recognition features for one or for different persons to be located. In particular, the recognition feature is able to be provided and/or stored for the person recognition module. The recognition feature can be newly stored and/or input for example for the respective person that is to be located. The recognition feature can comprise a plurality of parameters and/or items of data. For example, the recognition feature comprises and/or is formed by a size, by a structure, by colors, items of clothing and/or shapes. For example, the recognition feature for a person that is to be located can be that the person has long brown hair, and is wearing a yellow sweater and blue pants. In particular, the person recognition module can include recognition features for the person that is to be located with respect to different views and/or recording perspectives, for example a different recognition feature of the person for recording perspectives from the front, from the back, from above and/or from the side.

The person recognition module is configured to search for the person that is sought and/or is to be located in the monitoring region based on the monitoring images and/or the recognition feature. To this end, for example the monitoring images, specifically the image sequence, are searched by the person recognition module for the presence of the recognition feature. If the recognition feature is present in the monitoring images, if all and/or a sufficient number of the recognition features are present, the person recognition module can be configured to infer that this is the person that is to be located.

According to the invention, the camera has a fisheye lens. In particular, the camera can have a fisheye lens element as the fisheye lens and/or as part of the fisheye lens. Fisheye lenses are in particular (objective) lenses that image an objective plane that is perpendicular to the optical axis in a non-proportional manner. Fisheye lenses in particular image onto an image plane with distortions. For example, especially line pieces that do not run through an image center are imaged in a curved manner. The fisheye lens is specifically configured to faithfully image surface ratios and/or radial distances. The fisheye lens and/or the camera furthermore preferably has an angle of view of at least 180° and specifically more than 210°. The fisheye lens can be embodied as a circular fisheye lens, as a full frame fisheye lens or as a cropped circle fisheye lens. The monitoring images in the image sequence and/or the image sequence thus have/has images of the portion of the monitoring region with fisheye effect.

The invention is based on the consideration that cameras having a fisheye lens can monitor a larger region of a scene than normal cameras, wherein at the same time less person obscuration occurs and fisheye images can also be converted into perspective images. When imaging with fisheye lenses, objects undergo less compression toward the periphery then at the center. A camera having a fisheye lens is also referred to as a fisheye camera. The camera is preferably embodied as a panorama camera having a 360° hemispherical recording region. For example, the camera is embodied as an omnidirectional camera. In one variant, the fisheye lens or the fisheye camera is embodied as a panomorph lens or a panomorph camera. A panomorph lens represents a specific design of a fisheye lens in which the optical properties of the lens in predetermined regions of the image are changed such that image processing, in particular object recognition, is made easier. This is achieved for example by virtue of the fact that the field of view is changed by optical distortions in a manner such that for example peripheral regions are presented in enlarged fashion. Alternatively or additionally, different numbers of pixels are provided in different image regions of the camera. In particular, the pixel density in peripheral regions is higher than at the image center.

It is particularly preferred that the monitoring apparatus have a perspective determination module. The perspective determination module can form a hardware module or a software module. For example, the person recognition module forms together with the perspective determination module an evaluation module. The perspective determination module is configured to determine a recording perspective in the monitoring images for a person moving in the portion of the monitoring region and/or for a moving object. A recording perspective is understood to mean, for example, the view of the person and/or the object from the front, the view from the back, a side view or a view from above. For example, if the camera is mounted on a ceiling with a bird's-eye perspective of the monitoring region, persons and/or objects are imaged, recorded and/or analyzed from different viewing angles, depending on their distance on the ground plane from the optical axis of the camera. For example, persons located directly underneath the camera are imaged and/or recorded in a bird's-eye perspective, while persons and/or objects are imaged more and more from the side as their distance from the optical axis increases. For example, the perspective determination module is configured to be able to infer a recording perspective based on features of the imaged moving person and/or on the object. Features can represent for example an extent, facial features or color gradients. This embodiment is based on the consideration that cameras having fisheye lenses have a specific beam path and are thus able to record persons and/or objects in different views, in particular also when the person and/or the object moves along a straight path. Until now, it has been necessary in the case of normal cameras to make the person follow a curved path, for example by using structural measures such as barrier tapes, so as to be able to generate a plurality of recording perspectives. In particular, prior literature has made reference to the fact that fisheye lenses are disadvantageous when used in monitoring cameras because of their distorting property, and their use is discouraged.

It is particularly preferred that the perspective determination module be configured to generate at least two useful images based on the monitoring images of a, in particular a single, camera and the associated recording perspectives. Provision is made here for example for the two useful images to be based on the image sequence of a single camera. If a plurality of cameras are used in the monitoring apparatus, preferably at least in each case two useful images per camera are generated. The useful images are characterized in particular in that, for the useful images of one camera, the person is shown in different recording perspectives. For example, in a first useful image the person is imaged from the front and in a further useful image the person is imaged from the back. Specifically, the perspective determination module is configured to generate more than two useful images, wherein said useful images are based on the monitoring images of one of the cameras. This embodiment is in particular referred to as multi-view generation, because it is possible, based on the recording of the monitoring region using the fisheye lens, for a single camera to generate useful images of the person and/or of an object that have different recording perspectives of the person and/or of the object.

According to one embodiment of the invention, the perspective determination module is configured to determine a useful image triple based on the image sequence. The useful image triple comprises three useful images, in particular based on the image sequence of a single camera. The three useful images in the useful image triple comprise, for example, a front view of the person and/or the object, a back view of the person and/or the object, and a side view. The perspective determination module can furthermore be configured to generate a useful image tuple, wherein the useful image tuple comprises more than three useful images, for example four useful images comprising a front view, a back view, a side view and a view from above. This embodiment is based on the consideration that at least two, three or more recording perspectives of the person and/or the object are obtainable using the fisheye lens based on the monitoring data of one camera and in this way the evaluation stability in the recognition of a person to be located can be improved. It is in particular possible to increase the interperson variance in this way.

Optionally, the perspective determination module is configured to correct a fisheye effect in the monitoring images and/or the image sequence. In particular, the fisheye effect is corrected using dewarping methods. For example software applications can be used to correct the fisheye effect. With particular preference, the fisheye effect in the monitoring images and/or in the image sequence is corrected before the recording perspective is determined. For example, all monitoring images in the image sequence are corrected for this purpose and subsequently the recording perspective is determined in the corrected images to generate the useful images therefrom. This embodiment is based on the consideration that the distorting properties of the fisheye lenses can be corrected and in this way further evaluation algorithms are able to be applied to the corrected images.

According to one embodiment of the invention, the perspective determination module is configured to present persons and/or objects in the useful images in an oriented fashion. Oriented for example means to present a person and/or an object upright. To this end, for example algorithms of personal alignment can be used. For example, the perspective determination module is configured to project a detected and/or moving person into an image, in particular a useful image, in a manner such that said person is standing upright in a bounding box. In particular, the fisheye effect can be corrected by the perspective determination module after the orientation of the person in the useful image.

It is particularly preferred for the person recognition module to be configured to track the moving person and/or the moving object. For example, tracking can comprise determining the path and/or the velocity of the person and/or of the object. Tracking can be used in particular by the person recognition module for extrapolating the continuing path and/or trail into the future. In particular, the alignment of the person in the useful images is based on previous tracking of the person. If the movement pattern is known, it is possible to infer an orientation of the person and/or of the object and to present it in an aligned fashion in the useful images.

In particular, the perspective determination module is configured to infer which recording perspectives are present in the respective monitoring images based on the tracking and/or tracking results, for example the path and/or the velocity. For example, if it is known that at a time point in the past the person was imaged from the front, it is possible to infer, based on the tracking and/or the path, that the person must be viewable at a later time point in a recording from the back or in a side view.

According to one embodiment of the invention, the perspective determination module is configured to determine the recording perspective based on a machine learning algorithm, a computer vision algorithm or a deep learning method. Alternatively or additionally, geometry and the tracked person trajectory can be used. In particular, the perspective determination module is based on a neural network, in particular a recurrent and/or coupled neural network.

In particular, the monitoring apparatus has a feature determination module. In particular, the perspective determination module can comprise the feature determination module. The feature determination module can form a hardware module or a software module. The feature determination module is configured to determine person features based on the useful images. In particular, the feature determination module can be configured to determine personal features for each useful image. Person features are, for example, descriptors and/or features of a person and/or an object. For example, person features are color gradients, items of clothing, hairstyles, proportions and/or gender. The person features are in particular suitable for determining and/or characterizing a person signature. The person recognition module is configured to search for and/or locate the person to be recognized based on the person features and the recognition feature. For example, the person recognition module is configured to compare the person features to the recognition feature and, if there is a match, to infer that this is the person that was sought. It is particularly preferred that the feature determination module be embodied and/or based on a machine learning, computer vision or deep learning method.

It is particularly preferred that the monitoring apparatus have a fusion module. In particular, the fusion module is part of the feature determination module and/or part of the perspective determination module. The fusion module is configured to combine person features of a person from different useful images, in particular useful images based on the image sequence of a single camera, to form a master feature. For example, the fusion module can be configured to associate the existing person features with a recording perspective. Specifically, the person recognition module is configured to search for the person to be recognized in particular based on the master feature and the recognition feature. To this end, the recognition feature is, for example, embodied analogously to the master feature, and a perspective is likewise associated for example with the recognition features. It is consequently possible for example that the person recognition module declares the person that is to be recognized as found only when person features are re-identified in different useful images, in particular in the different perspectives of the person.

According to a further embodiment of the invention, the monitoring apparatus has a person image fusion module. The person image fusion module is configured to generate a master useful image for a person based on the useful images, wherein a fusion person feature is determined by the master useful image. The person recognition module is here configured to search for and/or locate the person to be recognized based on the fusion person feature and/or on the fusion person features and the recognition feature.

The methods of the fusion module and/or the person image fusion module used are in particular various fusion methods. For example, it is possible to use an early fusion strategy or a late fusion strategy or a hybrid fusion strategy. Alternatively and/or additionally, a deep learning strategy can be employed. For an early fusion strategy, monitoring and/or useful images or features from the monitoring and/or useful images are initially combined, and then a resulting feature vector is generated that is used to re-identify the person and is compared for example to the recognition feature. In a late fusion strategy, the recognition features are compared separately for each monitoring and/or useful image, and only then is the fusion performed.

One example of an early fusion strategy is for example the generation of a super image. The super image is for example the master useful image. To this end, for example three useful images of the same size, for example number of pixels, is generated from the and/or as a useful image triple. The feature vector for a person in a camera can be described as $\vec{F}=f(I_{Super})$, wherein $I_{Super}$ is definable as $$I_{Super}^{(m \times 3 \cdot n)}=[I_{Front}^{(m \times n)}, I_{Side}^{(m \times n)}, I_{Back}^{(m \times n)}] \qquad (a)$$

wherein I in each case represents a useful image, the index indicates the perspective and m, n indicates the number of pixels in row/column.

A further method of the early fusion strategy can form for example the feature concentration. In contrast to the previous strategy described, the features are first extracted from the useful images, wherein subsequently the three features are concentrated into a main feature vector, wherein the main feature vector with the recognition features is used to recognize the person. The main recognition vector can be described as $$\vec{F}^{(1\times(a+b+c))} = [\vec{F}_{Front}^{(1\times a)}, \vec{F}_{Side}^{(1\times b)}, \vec{F}_{Back}^{(1\times c)}]$$

One example of a late fusion strategy is for example the inverse rank position algorithm (IRPA); alternatively and/or additionally, the inverse score position algorithm (ISPA) or the product rule algorithm (PR) can be used as late fusion strategy. ISPA and IRPA are based on the mathematical harmonic mean.

A deep fusion strategy can likewise be applied. In this case, training data are used to learn fusion by way of machine or deep learning.

It is particularly preferred that the camera have a mounting means. The mounting means is configured for the arrangement and/or attachment of the camera in the monitoring region, in particular on the ceiling of the monitoring region. The mounting means is preferably configured such that the camera records the monitoring region in a bird's-eye perspective. In particular, the camera is attached via the mounting means in the monitoring region in a manner such that the optical axis of the camera is perpendicular to the ground plane of the monitoring region. This embodiment is based on the consideration that a plurality of perspectives of a person can be generated in the useful images on account of the arrangement of the camera in the bird's-eye perspective if the person moves within the space.

According to one embodiment of the invention, the monitoring apparatus has a further optical sensor unit. For example, the further optical sensor unit is a monitoring camera, in particular a monitoring camera without a fisheye lens. The further optical sensor unit is configured to monitor the monitoring region and/or the portion of the monitoring region by imaging and to provide additional image data of the monitoring. The person recognition module is preferably configured to additionally use the additional image data to recognize the person based on the monitoring images. This embodiment is based on the consideration of being able to provide a more robust monitoring apparatus for the recognition of the person.

A further subject of the invention is formed by a method for monitoring a monitoring region and/or for re-identifying a person that is sought in the monitoring region. Provision is made here for the monitoring region to be monitored by imaging using a camera, wherein the camera has a fisheye lens and uses it to monitor and/or image the monitoring region. Based on the monitoring images recorded with the fisheye lens, the monitoring region is searched for the person that is to be recognized. According to the method, useful images showing the person moving within the monitoring region from different perspectives can in particular be generated and/or gathered by way of monitoring the monitoring region using the camera based on the recording with the fisheye lens.

The monitoring apparatus preferably comprises, for person recognition in a monitoring region, an unmanned aerial vehicle, wherein the camera having at least one fisheye lens is arranged on the unmanned aerial vehicle. The person recognition module and/or the perspective determination module and/or the feature determination module and/or the fusion module and/or the person image fusion module is/are additionally arranged in the unmanned aerial vehicle. The image sequence of the monitoring region in the method for person recognition is recorded with particular preference during a flight of the unmanned aerial vehicle, wherein at least two useful images, in particular three useful images, are generated from the recorded image sequence, wherein the useful images show the person in different recording perspectives. An unmanned aerial vehicle is characterized in that no persons for piloting are onboard the aerial vehicle. Rather, the unmanned aerial vehicle is piloted autonomously using an onboard computer and/or by a pilot by remote control. The unmanned aerial vehicle is preferably a helicopter, in particular a quadcopter. This monitoring apparatus and this method for person recognition have the advantage that drones need fly over gatherings of people only once and the recorded monitoring images can be used to analyze persons from different views. It is possible to create different views of the person during the flight by way of the fisheye lens element. To this end, the drone needs to fly over the person only once, and without following a specific trajectory. It is thus advantageously possible to create both a front view and a back view of a person. If a front and back view are available, the person recognition is improved because people generally look different from the front than from the back. Hair that is tied into a ponytail, for example, is viewable in this form only from the back, while a shirt underneath a jacket is viewable only from the front. This monitoring apparatus and the method using a drone for person recognition are suitable in particular for use by the police at major events with a large number of people. By integrating the fisheye camera in the drone, the flying time of the drones is advantageously reduced because the useful images of the persons in different recording perspectives can be generated more quickly. This helps reduce the energy consumption when using the drones. Patrolling drones can therefore operate for longer until they need to be recharged. The number of drones for major events can therefore be reduced. The monitoring apparatus with the drone is advantageously used together with stationary recognition systems. For example, if a person has registered in a stationary recognition system in a front view and is to be re-identified, it is necessary to fly over the search region only once, independently of the movement direction of the persons within the search field, to obtain all the necessary views of the person. In one variant, the monitoring apparatus is embodied such that, in a first method step, the search is initially performed at a greater spatial distance from the person only on the basis of the same color features. In a second method step, the drone flies closer to persons that have been preselected on the basis of matching color features so as to provide higher-resolution recordings of the preselected persons. For example, if a person that is sought is wearing green and a person wearing green is found, the drone can fly closer to the person and provide recordings of higher resolution without the drone being required to perform a second flight. In this case, one side of the person's body is then imaged with a higher resolution than the other, but both sides can be used for recognition and early search space reduction.

BRIEF DESCRIPTION OF THE DRAWINGS

Further advantages, effects and embodiments are apparent from the attached figures and the description thereof. In the figures.

DETAILED DESCRIPTION

Figure 1:
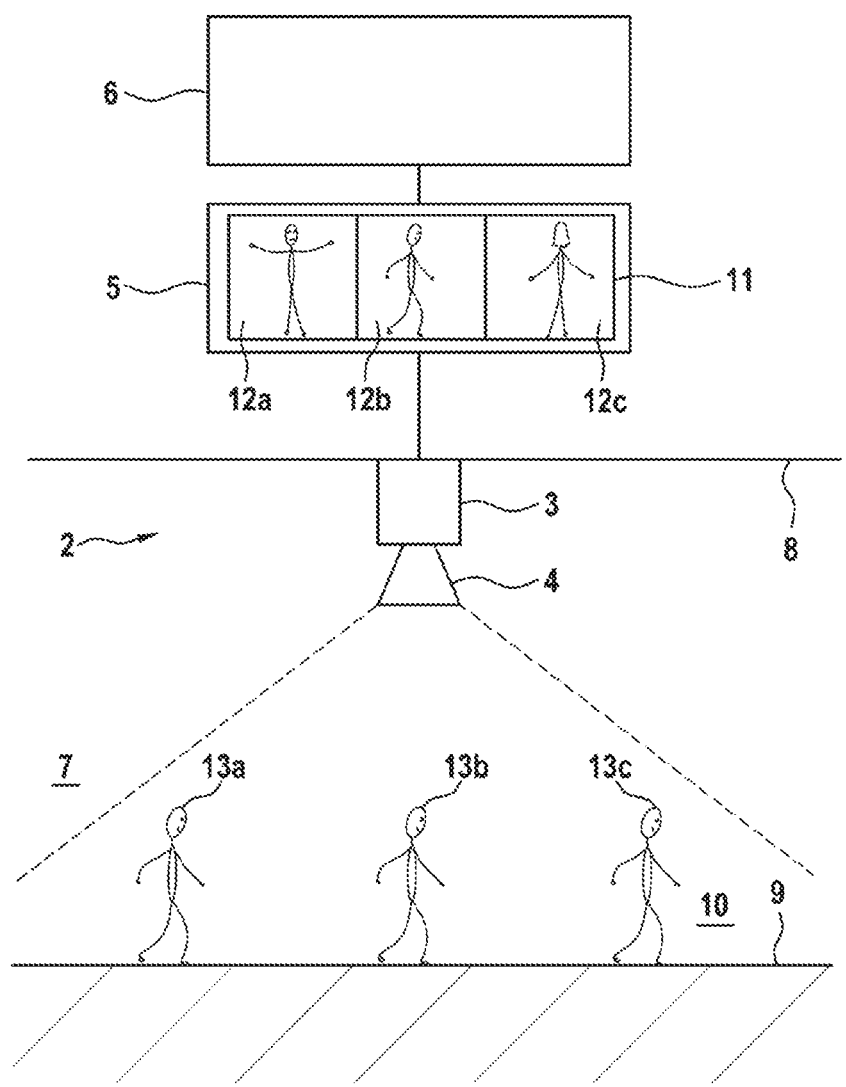
FIG. 1 shows an exemplary embodiment of a monitoring apparatus.

FIG. 1 shows a monitoring apparatus 2 as an exemplary embodiment of the invention.

The monitoring apparatus 2 comprises a camera 3, wherein the camera 3 has a fisheye lens 4, a perspective determination module 5 and a person recognition module 6.

The camera 3 is configured for monitoring a monitoring region 7. The monitoring region 7 is an internal space, such as an airport. The monitoring region 7 has a ceiling 8 and a ground 9. The camera 3 is mounted on the ceiling 8 such that the camera 3 monitors the monitoring region 7 in a bird's-eye perspective. The camera 3 has a recording angle such that a portion 10 is imaged as a subset of the monitoring region 7.

The camera 3 records an image sequence consisting of a plurality of monitoring images of the monitoring region 7. A person can freely move within the monitoring region 7, wherein the person is imaged in the monitoring images. The monitoring images and/or the image sequence are fed to the perspective determination module 5 in a data-technological manner. The monitoring images have a fisheye effect.

The perspective determination module 5 is configured to generate useful images 12a, 12b and 12c from the monitoring images in the image sequence. To this end, the image sequence is searched for moving objects and/or persons and the recording perspective thereof is determined. Before the determination of the recording perspective, the fisheye effect can be corrected, for example using dewarping methods. Furthermore, the alignment of the moving person can be oriented by the perspective determination module 5, for example image portions of the monitoring images can be rotated such that the person is imaged upright in the useful images 12.

Recording perspectives are understood to be views of the person, in particular relating to whether the person is shown from the front, shown from the back or shown from the side. For example, the recording perspective for each person and/or each monitoring image in the image sequence is determined by the perspective determination module 5. The perspective determination module 5 is then configured to select image portions and/or monitoring images that show the person in different recording perspectives in order to generate the useful images.

The perspective determination module 5 is configured to determine a useful image triple 11. The useful image triple includes three useful images 12a, 12b and 12c, wherein the useful image 12a shows the person in a recording perspective from the front, the useful image 12b shows the person in a side recording perspective, and the useful image 12c shows the person in a recording perspective from the back. Rather than a useful image triple, it is alternatively also possible to use finer granular person views, for example a useful image quadruple, a useful image quintuple, a useful image sextuple, a useful image hextuple, etc.

The perspective determination module 5 can determine different recording perspectives for a person based on the monitoring images of a single camera 3 because the fisheye lens 4 images an object 13a, 13b and 13c moving in the monitoring region from different perspectives on account of the distorted optics. If the object 13b is situated directly under the optical axis of the camera 3, it is imaged in the bird's-eye perspective. If the object 13a is situated for example to the left of the optical axis, it is imaged from the front, and if the object 13c is situated to the right of the optical axis, a back view can be recorded, for example.

The useful image triple 11 is made available to the person recognition module 6. A person that is sought can be detected in the monitoring region based on the useful image triple 11 and an input and/or stored recognition feature, for example in the form of a recognition feature data set. The person recognition module 6 to this end compares features of the person in the useful images to the recognition features. If there is a sufficient match between features and recognition features, the person recognition module 5 can classify the person that is sought as having been found.

Figure 2:
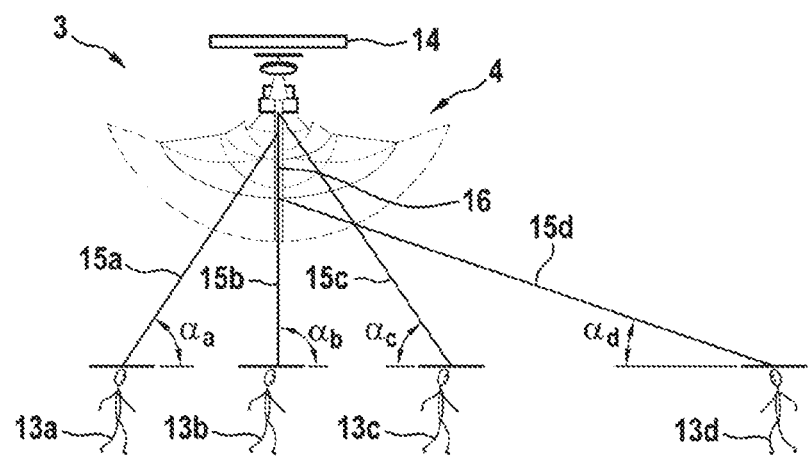
FIG. 2 shows an example of a beam path of a camera having a fisheye lens when using a non-single-viewpoint projection model.

FIG. 2 shows by way of example the beam path of the camera 3 having the fisheye lens 4 when using a non-single-viewpoint projection model. The camera 3 has an image sensor 14, which is embodied as a CCD or CMOS sensor. Rays 15a, 15b, 15c and 15d are imaged through the fisheye lens 4 onto the image sensor 14. The fisheye lens 4 and/or the camera 3 unlike typical cameras does not have a point-shaped projection center, but a line-shaped projection center 16.

The angle $\alpha_a$, $\alpha_b$, $\alpha_c$, $\alpha_d$ of the rays onto the moving object 13a, 13b, 13c, 13d is in each case different for the fisheye lens. The further the object 13a, 13b, 13c, 13d is away from the optical axis or the projection center 16, the smaller is the angle $\alpha_a$, $\alpha_b$, $\alpha_c$, $\alpha_d$. For example, the angle $\alpha_b$ for the object 13b situated directly underneath the camera 3 is 90°. The object 13a to the left of the projection center 16 has an angle $\alpha_a$ of approximately 45° and shows an imaging perspective from the front. The object 13c to the right of the projection center 16 has an angle $\alpha_d$ of approximately 20° and shows an imaging perspective of the object from the back. It is thus possible using the fisheye lens 4 to record different imaging perspectives of a moving object with a camera 3.

Figure 3:
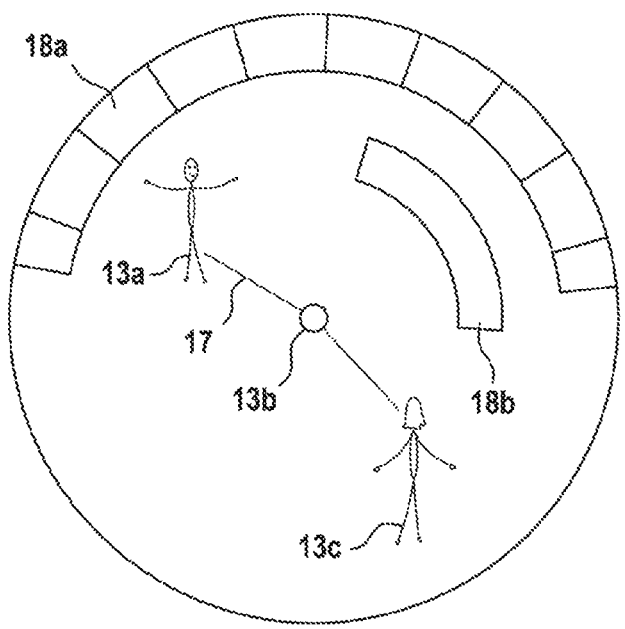
FIG. 3 shows an example of a monitoring image.

FIG. 3 schematically shows an overlay image of three monitoring images which are recorded with a time interval. The moving objects 13 in this case is a human being moving along a path 17. At a first time point, said person is imaged as the object 13a, at a second time point said person is imaged as the object 13b, and at a third time point said person is imaged as the object 13c. Two static objects 18a and 18b are furthermore imaged. The objects 18a, 18b are shelves that in reality are bent and straight. Due to the distorting properties of the fisheye lens 4, they are shown in a distorted fashion in the image. The object 18a in the peripheral region is here imaged such that it is particularly distorted and appears to be circularly curved. The object 18b, which is closer to the center, is likewise shown in a distorted fashion, but not curved quite that strongly.

Owing to these distorting properties of the fisheye lens 4, the person, as the moving object 13, is also imaged in different perspectives after the distance from the center or the projection center 16 changes. The person is here shown from the front as the object 13a, is shown from above as the object 13b at the center of the image, and is shown from the back as the object 13c when leaving the center.

In one variant of the exemplary embodiment described, the camera which is embodied as a fisheye camera, is mounted on an unmanned aerial vehicle (drone), in particular a helicopter. The monitoring device for person recognition in a monitoring region is set up to recognize persons from a drone's view. The camera, which is embodied as a fisheye camera or omnidirectional camera, is here mounted on the drone in the nadir direction. In this case, the drone with the fisheye camera or omnidirectional camera flies over a gathering of people. In the process, the person is recorded from different views due to the fisheye-type projection of the lens element. The person in this case moves through the scene and/or the drone moves relative to the person. Furthermore, the recorded monitoring images are subjected to a distortion correction, and at least two useful images, preferably three useful images, of the person are extracted from the recorded monitoring images in the form of a full recording. The three useful images preferably show the person once from the front, once from the site, and once from the back. Regarding the rest, the monitoring apparatus for person recognition in a monitoring region with a drone is embodied at least in part like the monitoring apparatus that was described above with respect to FIGS. 1 to 3.

The invention claimed is:

1. A monitoring apparatus (2) for person recognition in a monitoring region (7), the monitoring apparatus (2) comprising:
    at least one camera (3) for recording an image sequence of a portion (10) of the monitoring region (7) and having a fisheye lens (4),
    wherein the image sequence comprises a plurality of monitoring images,
    a person recognition module (6), wherein the person recognition module (6) is configured to search for a person to be recognized based on the monitoring images and at least one recognition feature for the person to be recognized,
    a perspective determination module (5), wherein the perspective determination module (5) is configured to determine a recording perspective of an imaged person moving in the portion (10) of the monitoring region (7) in each monitoring image of the plurality of monitoring images,
        wherein the perspective determination module (5) is further configured to generate at least two useful images (12a,b) based on the plurality of monitoring images from one of the cameras (3) and the associated recording perspectives, wherein the useful images (12a,b) each show a different recording perspective of the imaged person, and
    a person image fusion module, wherein the person image fusion module is configured to generate for the imaged person a master useful image based on the useful images (12a-c) and to determine a fusion person feature based on the master useful image, wherein the person recognition module (6) is configured to search for the person to be recognized based on the fusion person feature and the recognition feature.

2. The monitoring apparatus (2) according to claim 1, wherein the perspective determination module (5) is configured to correct a fisheye effect in the monitoring images.

3. The monitoring apparatus (2) according to claim 1, wherein the perspective determination module (5) is configured to reproduce the imaged person in oriented fashion in the useful images (12a-c).

4. The monitoring apparatus (2) according to claim 1, wherein the person recognition module (6) is configured to track the imaged person in the monitoring images and/or the useful images (12a-c).

5. The monitoring apparatus (2) according to claim 4, wherein the perspective determination module (5) is configured to infer and/or extrapolate the recording perspective based on the tracking of the imaged person.

6. The monitoring apparatus (2) according to claim 1, wherein the perspective determination module (5) is configured to determine the recording perspective based on a machine learning, a computer vision and/or a deep learning method.

7. The monitoring apparatus (2) according to claim 1, further comprising a feature determination module, wherein the feature determination module is configured to determine person features of the imaged person based on the useful images (12a-c), wherein the person recognition module (6) is configured to search for the person to be recognized by comparing the person features of the imaged person and the recognition feature of the person to be recognized.

8. A monitoring apparatus (2) for person recognition in a monitoring region (7), the monitoring apparatus (2) comprising:
    at least one camera (3) for recording an image sequence of a portion (10) of the monitoring region (7) and having a fisheye lens (4),
    wherein the image sequence comprises a plurality of monitoring images,
    a person recognition module (6), wherein the person recognition module (6) is configured to search for a person to be recognized based on the monitoring images and at least one recognition feature for the person to be recognized,
    a perspective determination module (5), wherein the perspective determination module (5) is configured to determine a recording perspective of an imaged person moving in the portion (10) of the monitoring region (7) in each monitoring image of the plurality of monitoring images,
        wherein the perspective determination module (5) is further configured to generate at least two useful images (12a,b) based on the plurality of monitoring images from one of the cameras (3) and the associated recording perspectives, wherein the useful images (12a,b) each show a different recording perspective of the imaged person,
    a feature determination module, wherein the feature determination module is configured to determine person features of the imaged person based on the useful images (12a-c), wherein the person recognition module (6) is configured to search for the person to be recognized by comparing the person features of the imaged person and the recognition feature of the person to be recognized, and
    a fusion module, wherein the fusion module is configured to combine person features of the imaged person from different useful images (12a-c) to form a master feature, wherein the person recognition module (6) is configured to search for the person to be recognized based on the master feature and the recognition feature.

9. The monitoring apparatus (2) according to claim 1, wherein the perspective determination module (5) is configured to determine at least three useful images (12a-c) as a useful image triple (11), wherein the three useful images (12a-c) of the useful image triple (11) each show the imaged person in a different one of a front view, in a back view and in a side view.

10. The monitoring apparatus (2) according to claim 1, wherein the camera (3) has mounting means for monitoring the monitoring region (7) in the bird's-eye perspective.

11. The monitoring apparatus (2) according to claim 1, further comprising a further optical sensor unit for monitoring the monitoring region (7) by imaging and for providing additional image data, wherein the person recognition module (6) is configured to search for the person to be recognized based on the additional image data.

12. The monitoring apparatus (2) according to claim 1, further comprising an unmanned aerial vehicle, wherein at least the camera (3) having a fisheye lens (4) is mounted on the unmanned aerial vehicle.

13. A method for person recognition in a monitoring region (7), the method comprising:
- recording an image sequence of the monitoring region 7 with at least one camera (3) having a fisheye lens (4), wherein the image sequence comprises a plurality of monitoring images,
- processing the image sequence in a person recognition module (6), wherein the person recognition module (6) has at least one recognition feature of a person that is to be recognized and is configured to search for the person to be recognized based on the monitoring images and the recognition feature,
- generating, from the image sequence, at least two useful images (12a,b), wherein the useful images (12a,b) each show a different recording perspective of an imaged person in the monitoring region (7),
- generating for the imaged person a master useful image based on the useful images (12a-c),
- determining a fusion person feature based on the master useful image, and
- searching the image sequence for the person to be recognized based on the fusion person feature and the recognition feature.

14. The method according to claim 13, wherein the image sequence of the monitoring region (7) is recorded during a flight of the unmanned aerial vehicle.

* * * * *